United States Patent [19]
Whiting

[11] 4,213,254
[45] Jul. 22, 1980

[54] ASTRONOMICAL OPTICAL SIMULATOR

[76] Inventor: Thomas A. Whiting, 5715 Old French Rd., Erie, Pa. 16509

[21] Appl. No.: 905,931

[22] Filed: May 15, 1978

[51] Int. Cl.² ........................ G09B 9/00; G03B 21/00
[52] U.S. Cl. ........................................ 35/43; 40/362
[58] Field of Search ............. 35/42.5, 43, 44, 17, 35/10, 13, 19 B; 40/362, 363, 364, 365; 272/8 R, 8 N, 8 D; 46/39, 226, 227, 228, 229

[56] References Cited
U.S. PATENT DOCUMENTS

| | | | |
|---|---|---|---|
| 1,828,057 | 10/1931 | Lunt et al. | 35/44 |
| 2,693,130 | 11/1954 | Green | 35/43 X |
| 2,748,652 | 6/1956 | Bauersfeld et al. | 35/43 X |
| 2,827,829 | 3/1958 | Spitz et al. | 35/43 X |
| 3,381,392 | 5/1968 | Markman | 35/17 |
| 3,382,026 | 5/1968 | Schwesinger et al. | 35/42.5 X |
| 3,388,484 | 6/1968 | Kipfer | 35/42.5 X |
| 3,411,218 | 11/1968 | Ferko | 35/42.5 |
| 3,589,035 | 6/1971 | Vickery | 35/42.5 |
| 4,045,885 | 9/1977 | Stern | 35/42.5 |

*Primary Examiner*—William H. Grieb
*Attorney, Agent, or Firm*—Charles L. Lovercheck

[57] ABSTRACT

An astronomical optical simulator made of a tubular body with an eyepiece at one end and a light source at the other with a slot in the tubular member to receive an opaque disk having openings distributed to simulate an array of astronomical bodies. The openings modify and pass light from the source giving the impression of an array of astronomical objects to an observer looking into the eyepiece.

8 Claims, 4 Drawing Figures

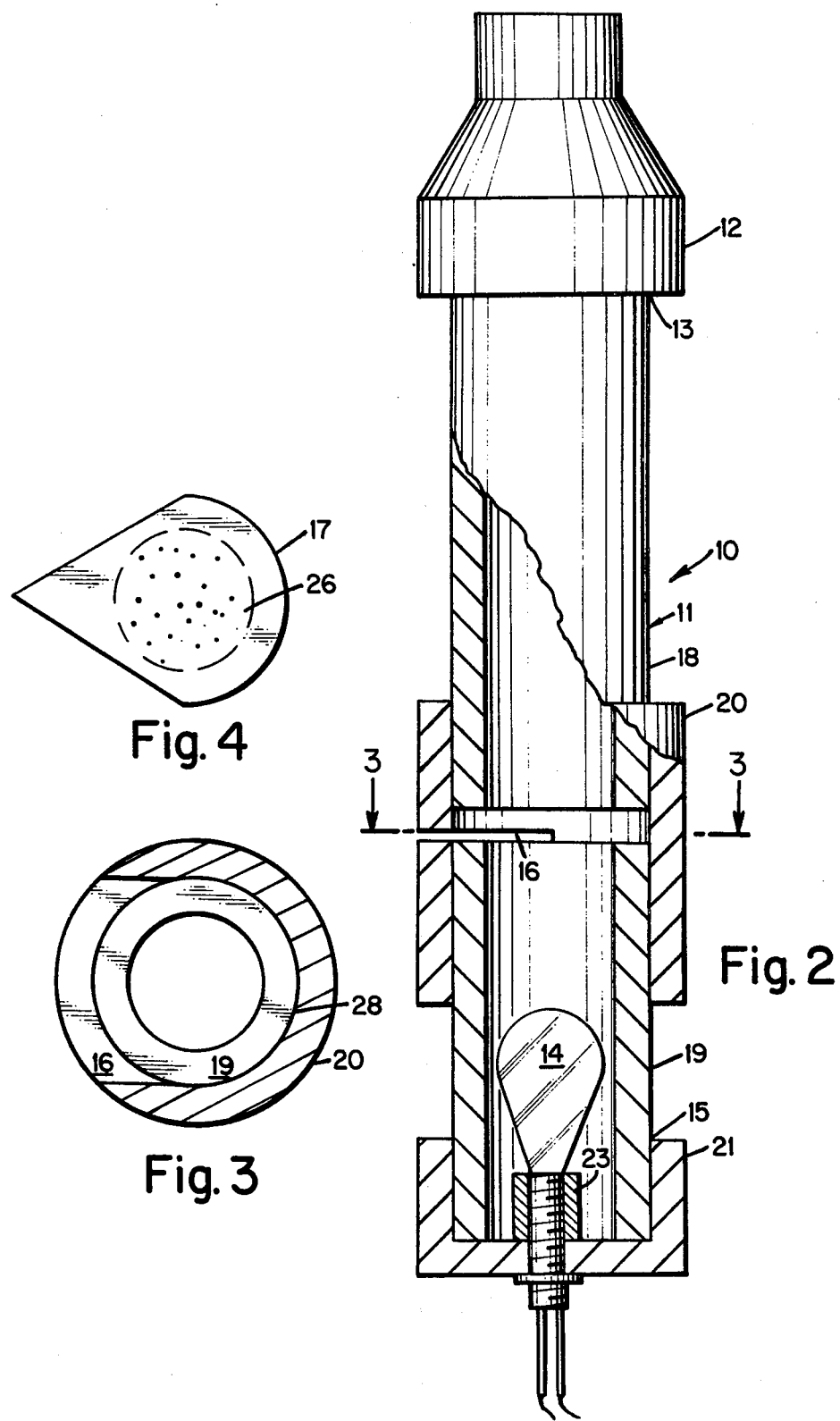

1

ASTRONOMICAL OPTICAL SIMULATOR

GENERAL STATEMENT OF INVENTION

The primary purpose of this device is to exactly simulate the view of astronomical objects as seen through a small amateur telescope or pair of binoculars. The device employs disks of heavy black paper with various holes of different diameters to duplicate the proper magnitude (brightness) of heavenly bodies. The proper color shading is obtained by attaching a piece of white paper, which has been colored to the proper hue, to the back of the heavy black paper.

No film or photographic process is employed and no movement is simulated as is in the large planetariums. Photographic slides of astronomical objects do not convey what the eye actually perceives through a telescope, since film has the ability to gather and store cumulative light over many minutes of exposure time. The human eye does not have this capability, thus the image seen naked-eye through the telescope (or binoculars) is never the same as a photograph of the same object.

The device is operated by simply sliding the proper disk into the slot provided, turning on the light source, and viewing through the eyepiece. After viewing, the disk is removed from the slot and a new one placed into the slot.

One useful purpose for this device is a teaching aid in the classroom without the need of an expensive telescope. The teacher may demonstrate to the student each individual constellation as if he were viewing that constellation through binoculars. Unlike the one, generally hurried, trip to the nearest planetarium during a semester's work, where the new student is usually overwhelmed with the mass of stars and constellations that he sees, with the Astronomical Optical Simulator an instructor can take his time and insure that the student has thoroughly mastered a particular constellation before proceeding onward. Thus, this device is a very valuable training aid in the field of educational Earth-Space science and astronomy.

Another purpose of this device would allow an amateur astronomer (or professional) to show his friends what it is like to look through a telescope, even if:
1. it happens to be cloudy outside;
2. it is daytime outside;
3. he does not want to bother setting up his expensive telescope; or,
4. he has his telescope set on a particular point in the sky and does not want to change its alignment just to show his friends a few stars and planets.

Another usefulness for this device would be to determine a prospective novice's interest in astronomy before spending hundreds of dollars on an actual telescope. And as a final purpose, to a small child, this device could be thought of as a toy.

There are no moving parts and no lenses employed; it is simplicity in itself. The disks are made out of heavy black paper. Holes are punched in the paper by means of a hand-punch to simulate the shapes of planets, nebulae, and globular star clusters. Stars are simulated by means of various diameter needles and pins inserted into the heavy black paper. After the desired design is completed, the proper color of the astronomical object is achieved by coloring another blank piece of lightweight white paper. This lightweight paper, after being colored with crayons, is then glued to the backside of the aforementioned black paper. The disk is then complete and ready for insertion into the simulation device. No photographic process is imployed. The primary purpose of this instrument is to achieve 100% simulation of what an observer views through his (or her) small telescope, or pair of binoculars, as in the case of whole constellation simulation. Photography, no matter how short the exposure time, never records astronomical objects the same way that the human eye perceives them. Thus, it was found that, for near-perfect duplication, disks have to be prepared in the manner described above.

REFERENCE TO PRIOR ART

The present invention constitutes an improvement over the following U.S. Pat. Nos: 2,693,130; 3,338,484 2,748,652; 3,411,218; 2,827,829; 3,589,035; 3,382,026; 4,045,885.

OBJECTS OF THE INVENTION

It is an object of the invention to provide an improved device for simulating astronomical displays.

Another object of the invention is to provide a device for teaching observational astronomy.

Another object of the invention is to provide an astronomical viewing device that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 2 is a partial longitudinal cross-sectional view of the device shown in FIG. 1.

FIG. 3 is a cross-sectional view taken on Line 3—3 of FIG. 2.

FIG. 4 is a top view of a disk for use in the device shown in FIGS. 1, 2 and 3.

DETAILED DESCRIPTION OF THE DRAWINGS

Figure 1:
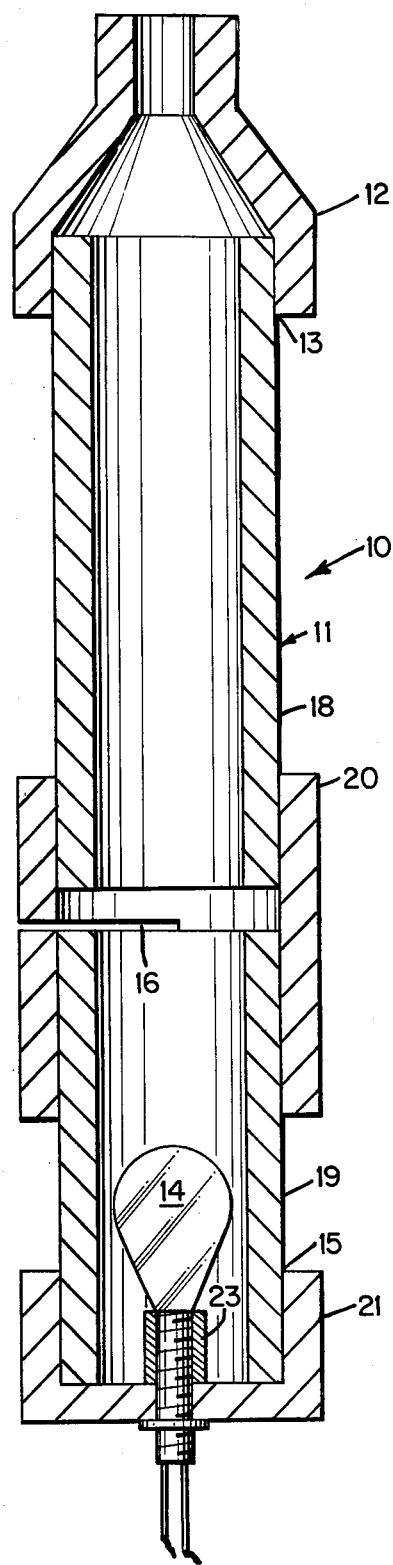
FIG. 1 is a longitudinal cross-sectional view of the device according to the invention.

Now, with more particular reference to the drawing. A viewing device 10 is intended for simulating an optical display as seen through a telescope. It has a tubular barrel 11, an eyepiece 12 on the first end 13 of the barrel and a light source 14 on the second end 15 of the barrel. Light source 14 may be an incandescent bulb. The barrel 11 is made of tubes 18 and 19, preferably of plastic, connected by sleeve 20 and having cap 21 and eyepiece 12. A laterally extending slot 16 in the sleeve 20 between the eyepiece 12 and the light source 14, supported in the socket 23, is adapted to receive a disk 17. The disk being made of an opaque material such as a heavy black paper having holes 26 distributed in the area 27 that will overlie the opening through the tubular barrel 11, thus the light from the source 14 will shine through the openings 26 forming bright spots on it. Holes may be punched in the disk 17 by means of a hand-punch to simulate the shapes of planets, nebulae, and globular star clusters. The stars are simulated by means of various diameter needles and pins inserted into the heavy black paper. After the design is completed, the proper color of the astronomical object is achieved by coloring another blank piece of lightweight paper. The lightweight paper, after being colored with crayons, is then glued to the back side of the aforementioned black paper. The disk 17 is then completed and ready for insertion into the simulation device.

It will be noted that the disks 17 are rounded at one end to conform to the inner diameter 28 of the sleeve 20. The disk 17 may have flat sides as shown that would extend out of the sleeve far enough for the operator to easily grasp the disk with his fingers.

An unlimited number of disks can be made to take care of each display of astronomical bodies desired by the user.

The foregoing specification sets forth the invention in its preferred, practical forms but the structure shown is capable of modification withing a range of equivalents without departing from the invention which is to be understood is broadly novel as is commensurate with the appended claims.

The embodiments of the invention in which an exclusive property or privilege is claimed are defined as follows:

1. A device for simulating an astronomical view as seen through a telescope comprising,
   a hollow tubular barrel made up of a first tubular member, a second tubular member and a sleeve,
   said sleeve receiving a first end of said first tubular member and a first end of said second tubular member,
   an eyepiece on the second end of said first tubular member,
   a light source in said second tubular member adapted to project light towards said eyepiece,
   an outwardly extending slot in said sleeve between said eyepiece and said light source,
   a disk made of a thin, black, opaque material in said slot having holes formed therein to simulate the astronomical view as viewed through a telescope.

2. The device recited in claim 1 wherein said light source comprises,
   an incandescent lamp.

3. The device recited in claim 1 wherein said slot is formed in said sleeve and extends there into,
   said slot having a width equal to the inner diameter of said sleeve.

4. The device recited in claim 1 wherein said slide has a semi-circular end having a diameter equal to the inner diameter of said sleeve and remote from said circular end being generally square and adapted to extend out of the side of said sleeve.

5. The device recited in claim 1 wherein said light source is supported on said second tubular member by means of a cup like end piece,
   said cup like end piece receiving an end of said second tubular member,
   and means holding said first tubular member to said eyepiece.

6. The device recited in claim 5 wherein said means supporting said lamp further comprises,
   an opening in said cup like end piece and a nipple extending through said opening,
   a lamp socket at an inner end of said nipple,
   said incandescent lamp being supported in said lamp socket.

7. The device recited in claim 1 wherein said eyepiece has a reduced size opening at one end and a large opening in the other end,
   said large opening receiving said first tubular member.

8. The device recited in claim 7 wherein said slot is formed in said sleeve and extends through one side thereof,
   said slot having a width equal to the inner diameter of said sleeve.

* * * * *